Nov. 29, 1938.  E. C. AKERS  2,138,533
DIRECTION SIGNAL FOR MOTOR VEHICLES
Filed July 22, 1936   2 Sheets—Sheet 1
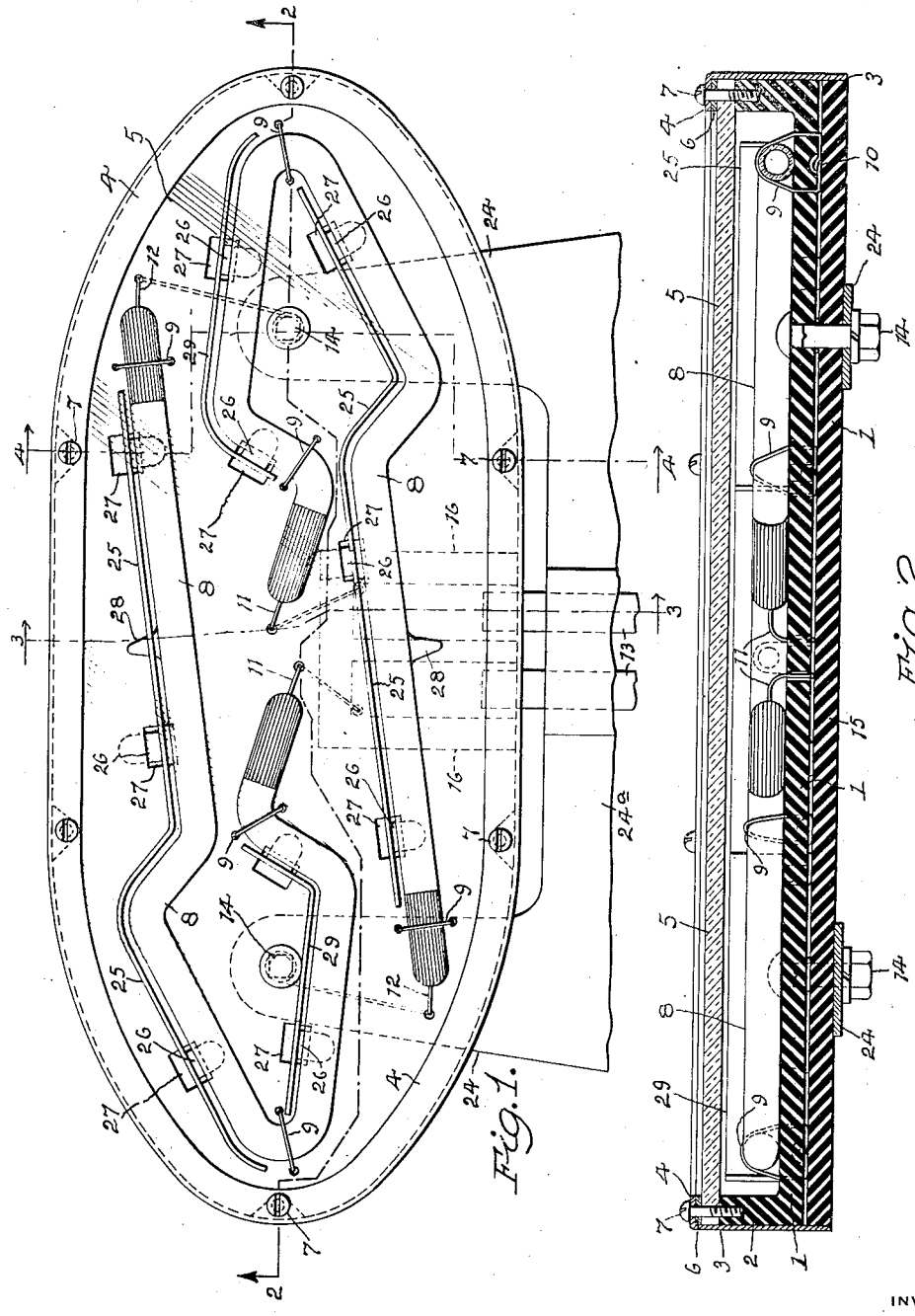
INVENTOR
Earl C. Akers,
BY
ATTORNEYS

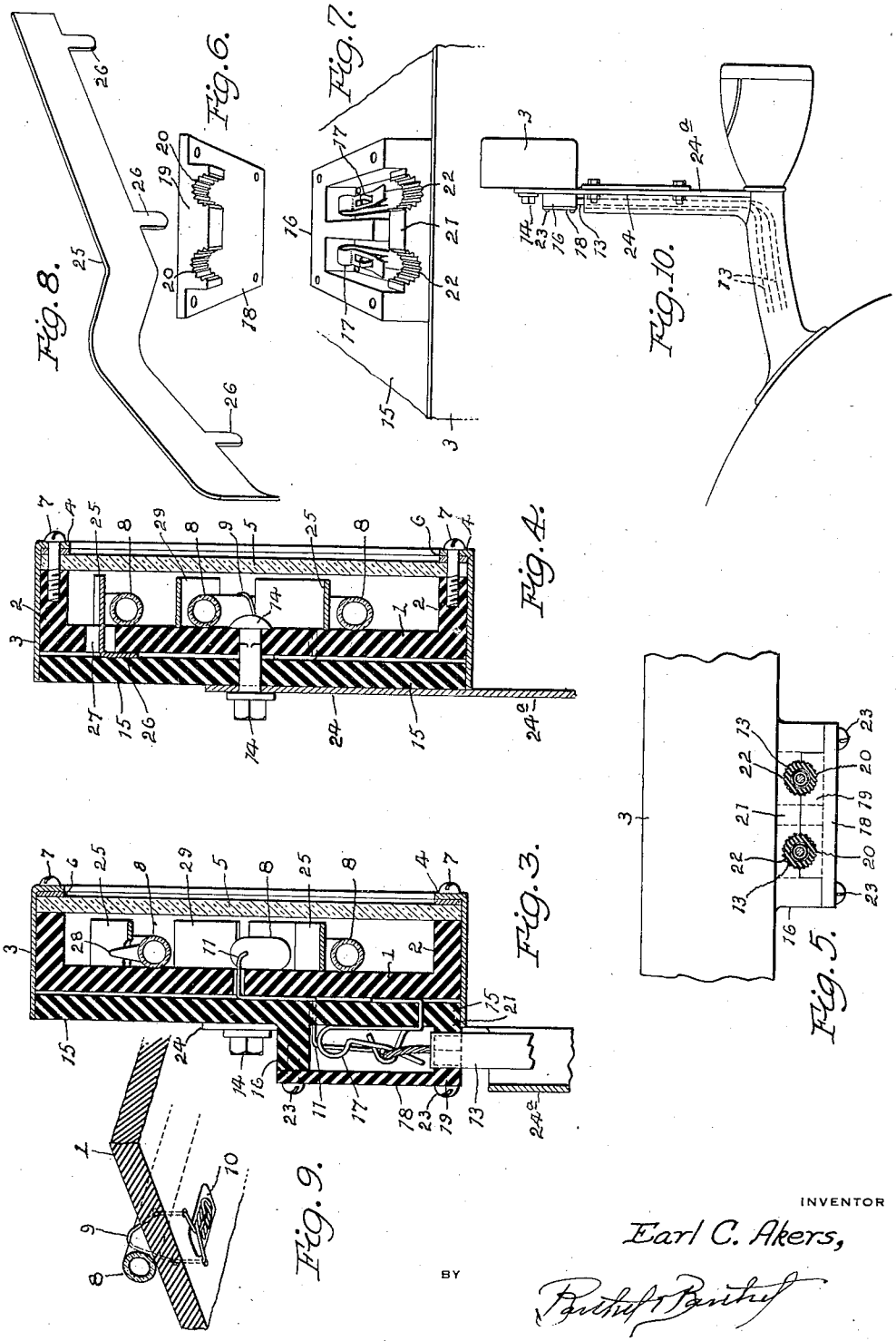

Patented Nov. 29, 1938

2,138,533

UNITED STATES PATENT OFFICE 2,138,533

DIRECTION SIGNAL FOR MOTOR VEHICLES

Earl C. Akers, Detroit, Mich.

Application July 22, 1936, Serial No. 91,826

7 Claims. (Cl. 177—329)

This invention relates to a signal device especially adapted for use upon motor vehicles for indicating the direction in which the driver is about to turn the vehicle or other machine to which the signal is applied, the present device including neon or other gas filled tubes bent to simulate arrows and mounted within a suitable casing having a glass front closure through which the arrow shaped tubes may be viewed at a distance.

It has been found that such tubes or other light emitting electrical devices, when lighted in the daytime, especially if the sun be shining upon them at an angle, do not show up plainly, and an object of the present invention is to correct this defect so that the signal may be plainly seen at a considerable distance under all circumstances. A further object is to provide a complete insulation and protection for the tubes, facilitating its manufacture and assembly, and making it dust and water tight. It is also an object to provide adjustable shields within the casing for shielding the tubes from the sun's rays and to so construct the casing that the shields will be adjustably held and the leading-in conduits will be firmly clamped and held against disconnection or displacement, rigidly holding both shields and conduits in the assembled device.

It is also an object to provide certain other new and useful features in the construction and arrangement of parts, all as hereinafter more fully described, reference being had to the accompanying drawings in which Figure 1 is a front elevation of the signal device illustrative of an embodiment of the present invention;

Fig. 2 is a longitudinal section substantially upon the line 2—2 of Fig. 1;

Fig. 3 is a transverse section substantially upon the line 3—3 of Fig. 1;

Fig. 4 is a transverse section substantially upon the line 4—4 of Fig. 1;

Fig. 5 is a partial bottom elevation of Fig. 3 showing the manner of clamping the leading-in cables;

Fig. 6 is a perspective view of a cover plate for the leading-in box which is integral with the back plate of the casing;

Fig. 7 is a perspective view of a part of the casing back plate showing the leading-in box integral therewith;

Fig. 8 is a perspective view of one of the tube shields detached;

Fig. 9 is a perspective detail showing the manner of securing the tubes to the back wall of the casing, and Fig. 10 is a view showing the manner of attaching the signal device to the lamp and license bracket of a motor vehicle.

This signal device as shown, includes a housing formed of Bakelite or other suitable insulating material with a back wall 1 of any desired configuration but preferably of oval outline as shown, having a peripheral laterally projecting integral flange 2 forming the surrounding side wall of the casing and enclosed within a sheath 3 of sheet metal, said sheath or ring being of greater width in cross section than the width of the flange 2 with one edge of the sheath inturned to form a flange 4 to project over the periphery of a glass closure plate 5 and hold the same seated upon the outer edge of the casing flange or wall 2, a packing ring 6 being interposed between said glass and flange 4 to make a dust and water tight joint. Screws 7 are passed through openings in said flange 4 and screwed into the edge of the wall 2 to force said sheath flange toward the glass and firmly clamp the same, at the same time detachably securing said sheath in place, thus forming a tight casing or housing for a pair of light emitting tubes which are preferably gas filled tubes 8 bent to simulate arrows and secured upon the inner or front face of the back wall 1 by means of small wires 9 passing over the tubes at convenient points, the ends of each wire being passed through holes in the back wall and twisted together within a recess 10 in the back face of said wall. This manner of securing the tubes not only provides for irregularities in the manufacture of the tubes, but also for expansion and contraction.

The leading-in or terminal wire 11 on each tube 8 is passed through an opening in the back wall 1 and extended against the back face thereof to a suitable point of connection hereinafter described, with the ends of leading-in insulated wires or cables 13, and the terminal or ground wires 12 at the opposite ends of said tubes are inserted through openings in the back wall 1, extended across the back face thereof to bolts 14 in openings in said back wall and which bolts are adapted for attaching the signal device to a suitable support as hereinafter described, although other grounding means may be used, such as grounding wires, and it is obvious that this device may be attached to the vehicles where desired, either at the front or rear or both, and in any suitable manner.

To protect the terminal and ground wires and close all of the openings in the back wall, a back plate 15 is provided, this plate being formed of suitable insulating material, such as Bakelite and is firmly secured to the back wall 1 by means of the bolts 14, or other suitable means, this plate being centered upon and firmly held against lateral movement, by the projecting edge portion of the sheath 3. To protect the connection of the cables 13 to the terminals 11 of the tubes, a box 16 is formed integral with the back plate 15 adjacent the lower edge thereof and within this box are secured suitable clips 17 for attaching the terminal wires 11 to the cables 13. This box 16 is provided with a detachable cover plate 18 which plate is formed with a suitable rib 19 adapted to fit closely within the outer end of the box and is formed with semi-circular seats 20 for the ends of the cables 13, said seats being roughened or corrugated to engage the cables and hold them against detachment from the box, said box being formed at its open end with a transverse flange or rib 21 formed with semi-circular seats 22 similar to the seats 20 and arranged in opposed relation thereto and formed with corrugations to engage the end portions of the cables. When the cover plate 19 is secured in place by means of screws 23, the box is tightly closed and the seats 20 are drawn into firm contact with the ends of the cables which are seated in the seats 22. Therefore the ends of the cables are rigidly clamped and at the same time their connections with the terminal wires of the tubes are protected against short circuiting by dampness and all dirt and water is excluded from the interior of the box and lamp housing.

As shown, the bolts 14 pass through openings in both the back wall of the housing and the back plate 15, and also through openings in arms 24 integral with the usual supporting bracket 24a for carrying the license plate for the vehicle. These bolts, therefore, not only serve to rigidly attach the signal device to the license plate bracket and form ground connections for the tubes 8, but also to secure the housing back wall 1 and the back plate 15 firmly together. As before stated, however, the housing may be supported and the tubes grounded otherwise than by the license plate bracket, as shown.

As before stated, the light of the tubes 8 can be seen for but a short distance in bright sunlight unless they be protected from downwardly slanting rays of the sun and therefore a shield or shields is provided for each tube, one shield conforming to the shape of the long arm of each tube, and this shield 25 is preferably and detachably held as shown, in adjacent spaced relation to the upper side of this long arm of each tube, each shield being formed at one edge with projecting lips or lugs 26 adapted to be inserted through rectangular openings 27 in the back wall 1 of the casing. These openings 27 are of greater area than the width of the lugs 26 and therefore in attaching the shield 25, this shield may be adjusted both longitudinally and toward and from the adjacent tube so that it will project outwardly from the face of the back wall 1 over the adjacent tube in accurately spaced relation thereto so that it will extend close to the tube but out of contact therewith throughout its length. In attaching the shield 25, the lugs 26 are inserted through the openings 27, and then bent laterally against and in firm contact with the rear face of the wall 1. Therefore when the back plate 15 is secured in place against the back wall 1, these lugs will be firmly clamped between the plate and wall to rigidly hold the shield accurately positioned and to protect the lugs 26. However, other means may be provided for adjustably holding each shield to provide for irregularities in the manufacture of the tubes so that the shields may be accurately positioned relative to each tube, and where it is found that the adjustment is not needed, each shield may be molded into or formed as a part of the back wall of the housing.

In the manufacture of these tubes 8 each is formed with a nib 28 and to provide for these nibs which project laterally from the tubes, an opening is provided in each of the shields 25 to receive the nib and these openings are of greater area than the nib to provide for adjustment of the shield 25.

The short portions of the tubes 8 which lie in opposed relation to the long portions, each forming one side of the arrow head, are each also shielded by means of a shield strip 29, these strips 29 being bent to conform to the shape of the short portion of the tube and each is attached to the back wall 1 by means of lugs 26 engaging openings 27 in the back wall similar to the manner of detachably and adjustably attaching the shields 25 to said back wall.

It will be noted that each of the shields 25 and 29 is placed adjacent the upper side of the adjacent portion of the tube and this is so that the downwardly slanting rays of the sun entering the housing through the glass closure 5, will not strike the tubes 8 at such an angle as to obscure them during the daytime and so that the arrows or tubes may be distinctly seen at a considerable distance even in bright sunlight.

By the particular manner described, of attaching the shields to the back wall of the housing, the assembly of the device is greatly facilitated and the shields may be accurately located just out of contact with the tubes. Further by providing the back plate 15 together with the sheath 3 for protecting the housing externally and for firmly holding the glass closure 5 and making a tight joint therewith, a housing for the neon tubes which is absolutely tight and from which all moisture and dirt will be excluded, is provided and this back plate 15 greatly facilitates the assembly of the device and forms a perfectly tight cover of insulating material for the back of the housing, this cover or back plate 15 also serving to protect all wires and being formed with the box 16, not only encloses and protects the terminal connections, but also provides a positive clamp to hold the ends of the leading-in cables.

Obviously changes may be made in the details of construction and arrangement of parts without departing from the spirit of the invention and I do not therefore limit myself to the particular construction shown.

Having thus fully described my invention what I claim is:

1. A direction signal device including a housing having an insulating back wall, an electrical light-emitting member of direction indicating form, means for securing said member within said housing directly against the insulating back wall thereof, said electrical member having terminal wires extending through said wall, and a back plate formed of insulating material and detachably secured to the back of said wall to cover and protect said terminals and clamp the same between said wall and plate.

2. A direction signal including a housing formed with an insulating back wall, a gas filled tube of direction indicating form, means for securing said tube within said housing directly against said back wall thereof, said tube having terminal wires extending through openings in said back wall, a back plate of insulating material and of an area substantially equal to that of said back wall and secured to said back wall and covering said openings therein and said terminal wires, and a ring sheath fitting over the peripheries of said housing and back plate to close said housing dust and water tight.

3. A direction signal device including a housing having an insulating back wall, a gas filled light tube of direction indicating form within said housing against said back wall and having substantially horizontal portions, and a plurality of shield strips within said housing projecting outwardly from said back wall, one over and adjacent to the upper side of each of said tube portions to shield the tube from the slanting rays of the sun and make the light rays emitted by the tube visible at a distance during the daytime.

4. A direction signal device as characterized in claim 9, and wherein said shield strips are each provided along one edge with integral projections for detachably and adjustably securing said strips to said wall in edge engagement therewith, said wall being provided with means to cooperate with said projections in adjustably holding said strip.

5. A direction signal device including a housing having an insulating back wall, a gas filled light tube mounted within said housing against said back wall, a shield strip projecting forwardly within said housing over and adjacent to the upper side of said tube and having bendable projections along one edge, said back wall being formed with openings to receive said bendable projections, the area of said openings being greater than the cross sectional area of said bendable projections to permit of adjustment of said projections within said openings and the adjustment of said strip relative to said tube, said projections being bendable into contact with the rear face of said wall to hold said strip in place against the forward face of said wall, and an insulating plate detachably secured to said back wall over the openings therein, and means for securing said plate to said wall with said bendable projection on said strip clamped therebetween.

6. A direction signal device including a housing having an insulating back wall, a pair of gas filled light tubes bent to simulate arrows and secured within said housing against said back wall, shield strips secured within said housing in outstanding relation to said back wall and each projecting over the upper side of a substantially horizontal portion of said tubes in spaced relation thereto, means upon each of said strips along one edge thereof, said back wall being formed with openings to receive said means, said openings being each of an area to permit adjustment of each of said means laterally therein and the adjustment of said strip toward and from the adjacent tube, an insulating back plate, and means, extending through said back wall and back plate and adapted to draw said plate toward said wall and clamp said means on said shield strips therebetween.

7. A direction signal device including a housing formed of insulating material with a back wall thereof formed with openings, a pair of light tubes within said housing secured against the back wall thereof by means of wires or the like passed over said tubes and extended through said openings in said back wall with the ends of said wires twisted together within a recess provided in the back face of said back wall, said tubes having terminal wires extending through said openings in said wall, a back plate formed of insulating material and of an area substantially equal to the area of the back wall of the housing, said insulating back plate being formed with a chamber with a terminal wire of each tube extending into said chamber and said back plate formed and recessed to receive said terminal wires, a leading-in cable for each tube projecting into said chamber and electrically connected with one of said terminal wires within said chamber, and means for detachably securing said back plate to said back wall of said housing to close all of said recesses and clamp said cables.

EARL C. AKERS.